United States Patent [19]

Williams

[11] Patent Number: 5,774,804
[45] Date of Patent: Jun. 30, 1998

[54] REMOTE ACTIVATION OF MOBILE TELEPHONE BY PAGING CHANNEL PHANTOM NUMBERS

[75] Inventor: Ian C. Williams, Hampshire, England

[73] Assignee: Nokia Mobile Phones Limited, Salo, Finland

[21] Appl. No.: 627,371

[22] Filed: Apr. 4, 1996

[51] Int. Cl.$^6$ ..................................................... H04Q 7/00
[52] U.S. Cl. ........................................... 455/419; 455/410
[58] Field of Search .................................. 455/419, 410, 455/418, 403, 551, 550; 340/825.34; 380/23

[56] References Cited

U.S. PATENT DOCUMENTS

| | | | |
|---|---|---|---|
| 5,046,082 | 9/1991 | Zicker et al. | 455/410 |
| 5,073,932 | 12/1991 | Yossifor et al. | 455/410 |
| 5,109,403 | 4/1992 | Sutphin | 455/419 |
| 5,155,860 | 10/1992 | McClure | 455/89 |
| 5,233,656 | 8/1993 | Langrand et al. | 380/23 |
| 5,276,729 | 1/1994 | Higuchi et al. | 455/564 |
| 5,297,191 | 3/1994 | Gerszberg | 455/419 |
| 5,297,192 | 3/1994 | Gerszberg | 455/419 |
| 5,343,494 | 8/1994 | Averst et al. | 375/1 |
| 5,455,863 | 10/1995 | Brown et al. | 455/410 |
| 5,608,723 | 3/1997 | Felsenstein | 455/410 |

FOREIGN PATENT DOCUMENTS 2 249 923  5/1992  United Kingdom.
WO 92/17943  10/1992  WIPO.

OTHER PUBLICATIONS

"Digital Opens the Door to Over–the–Air Activation", J. Carden, Cellular Business, Jan. 1994, pp. 50&52.

*Primary Examiner*—Dwayne D. Bost
*Assistant Examiner*—Tracey M. Legree
*Attorney, Agent, or Firm*—Perman & Green, LLP

[57] ABSTRACT

In a system of multiple radiotelephones, such as mobile telephones, wherein each of the telephones is operative with a paging channel by which a calling number is applied to the telephones enabling the respective telephones to respond to their respective channels, the paging channel is utilized for activating individual ones of the telephones. A set of calling numbers is reserved and not employed for calling numbers, but is stored within a memory of each of the telephones. The reserved calling numbers serve as a glossary for encoding words of a command message to be transmitted via the paging channel, and also enable a decoding at each telephone of the encoded message. The command message supplies a designated calling number to a specified one of the mobile telephones, the specified telephone being identified by its electronic serial number.

4 Claims, 4 Drawing Sheets

| BYTE 1 | SOM | START OF MESSAGE FLAG e.g 0x7E |
|---|---|---|
| BYTE 2 | ESNa | FIRST BYTE OF ESN |
| BYTE 3 | ESNb | |
| BYTE 4 | ESNc | |
| BYTE 5 | ESNd | LAST BYTE OF ESN |
| BYTE 6 | MIN1a | FIRST BYTE OF MIN |
| BYTE 7 | MIN1b | |
| BYTE 8 | MIN1c | LAST BYTE OF MIN |
| BYTE 9 | SIDa | FIRST BYTE OF SID |
| BYTE 10 | SIDb | LAST BYTE OF SID |
| BYTE 11 | FLAGS | CONFIG FLAGS(e.g MENU ENABLE) |
| BYTE 12 | CRCa | CYCLIC REDUNDANCY CHECKSUM |
| BYTE 13 | CRCb | |
| BYTE 14 | EOM | END OF MESSAGE FLAG SAY 0xFF |

REMOTE ACTIVATION OF MOBILE TELEPHONE BY PAGING CHANNEL PHANTOM NUMBERS

BACKGROUND OF THE INVENTION

This invention relates to the remote activation of mobile telephones by communication of an activation command from a central station, and, more particularly, to the encoding of a command message by use of a set of phantom numbers of a paging channel to which the telephone is responsive.

Mobile telephones are widely used today. Utilization of such a telephone involves a two-step procedure wherein, as a first step, a user acquires a telephone by buying or leasing the telephone from a dealer. This usually requires a trip to the dealer to receive the telephone. As a second step of the procedure, the user of the telephone must then have the telephone activated whereby the telephone is assigned a telephone number from a cellular telephone service. Receipt of the telephone calling number has required two-way communication between the user and the telephone service company, wherein authentication of sale or lease of the telephone is ascertained with the aid of an electronic serial number (ESN) built into the telephone at the time of manufacture.

A problem arises in that the foregoing two-step procedure is unduly cumbersome. Once a user has acquired his telephone, it would be desirable to have the calling number assignment done automatically, such as by electronic communication with a central station. However, such communication is impeded by the fact that mobile telephones do not normally have two-way communication with a central station prior to activation of the telephone.

SUMMARY OF THE INVENTION

The foregoing problem is overcome and other advantages are provided, in accordance with the invention, by an activation system for a mobile telephone. It is observed that a mobile telephone can receive signals of the paging channel, even in the absence of assignment of a calling number to the telephone. Thus, a mobile telephone receives the paging channel signal including all of the calling numbers which are broadcast. The existing calling number detection circuitry, upon activation of the telephone, identifies an incoming calling number by comparison with its own assigned reference calling number. In the prior art, if no calling number has been assigned to the telephone, the paging numbers are ignored, and no two-way communication is initiated between the mobile telephone and the central station.

However, in accordance with the invention, the capacity for the paging channel of an unactivated telephone to receive the calling numbers provides the opportunity for reception of a message from the central station. This is accomplished by encoding individual words of the message with an alphabet of which individual letters are represented by a set of calling numbers which are reserved for this purpose and are not assigned to any mobile telephone and are not employed for calling a telephone for initiating communication. This set of calling numbers may be referred to as phantom calling numbers. The existing calling number detection circuitry is used, prior to activation of the telephone, in accordance with the invention, for comparing the individual incoming calling numbers with each of the set of phantom calling numbers. The same set of phantom calling numbers is previously stored within a memory of

2 each of the mobile telephones of the telephone system. The set of the phantom numbers is employed to represent respective alphabet characters for construction of words to be transmitted in an activation command message transmitted from the central station over the paging channel to the mobile telephone.

In order to activate the mobile telephone, a signal is transmitted by the mobile telephone to the central station requesting activation. The telephone transmits its ESN and, possibly, other data such as credit card information, if desired. A computer at the central station, or in communication with the central station via a telephone link, can then verify that the phone has been appropriately sold or leased, and that the credit details are on record. The telephone company provides the stored phantom numbers to the computer to enable the computer to develop the alphabet for transmission of the message. Thereupon, the computer communicates via a wireless telephone link to the mobile station for down-loading the specific number to be used as the calling number identifying the mobile station.

The invention is advantageous in that the procedure for establishing the calling number of the mobile telephone can be accomplished automatically. By way of example, a user of the telephone may simply plug in the charger for charging the battery. In response thereto, the telephone initiates the foregoing sequence of steps beginning with the transmission to the central station of the signal requesting the calling number. Thus, a user of the mobile telephone has been totally freed from the tasks involved in the establishment of the calling number of the telephone.

BRIEF DESCRIPTION OF THE DRAWINGS

The aforementioned aspects and other features of the invention are explained in the following description, taken in connection with the accompanying drawing figures, wherein:

FIG. 4 is a chart showing the composition of words of a command message sent to mobile telephones for activating the telephone.

Identically labeled elements appearing in different ones of the figures refer to the same element in the different figures but may not be referenced in the description for all figures.

DETAILED DESCRIPTION

Figure 1:
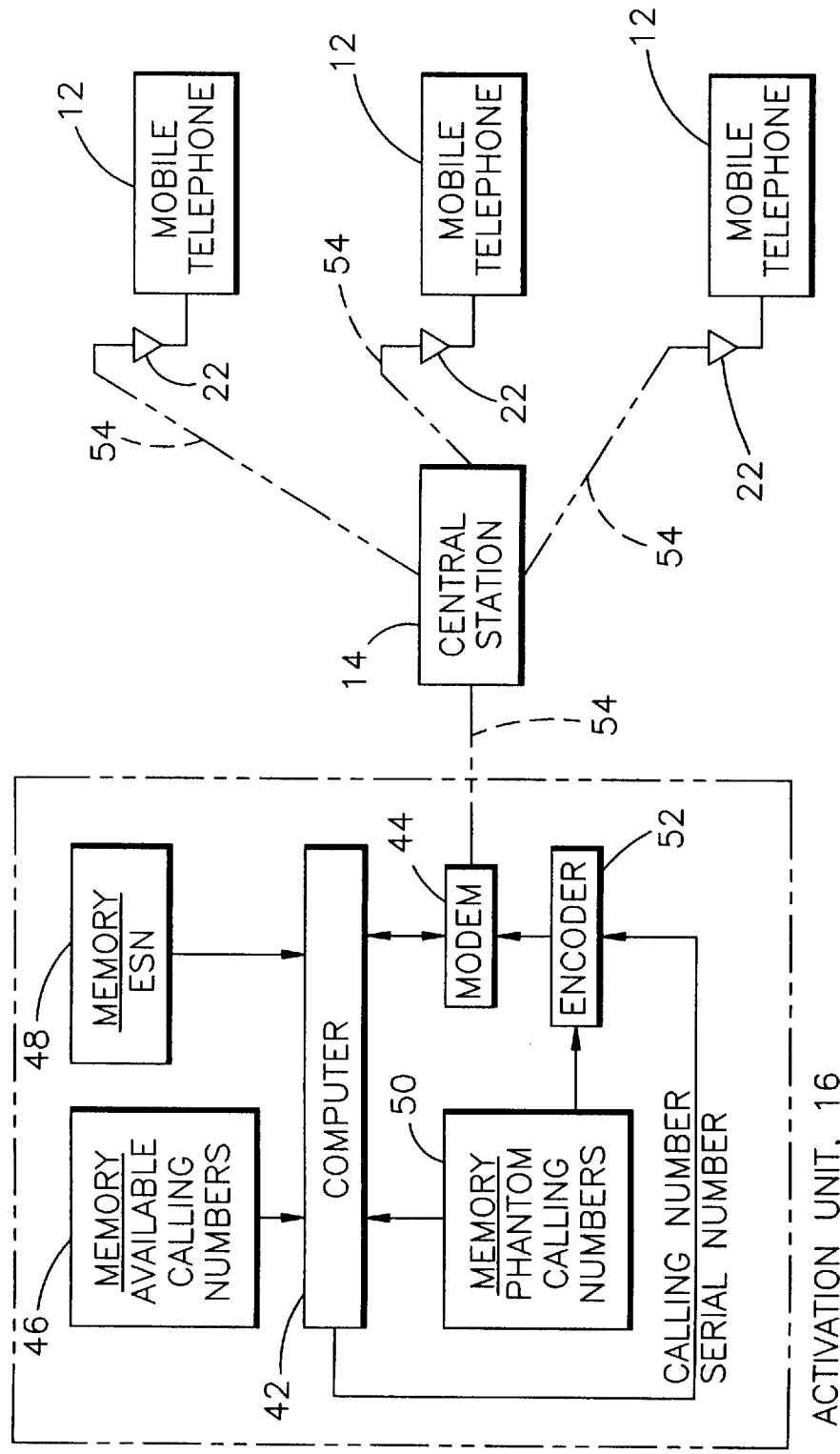
FIG. 1 is a block diagram of a telephone system wherein mobile telephones are activated in accordance with the invention.

FIG. 1 shows a telephone system 10 providing communication among many telephones 12, three of which are shown by way of example. The system 10 provides a process for activation of the telephones 12 in accordance with the invention. Typically, the telephones 12 are radiotelephones or mobile telephones interconnected via a central station 14. In the activation process, individual ones of the telephones 12 are provided with respective calling numbers. The activation is accomplished by use of an activation unit 16 which is shown separate from the central station 14 but, if desired, may be located at the same site with the central station 14. It is noted that while the invention is most useful for the activation of wireless mobile telephones communicating by radio to the central station 14, the invention can also be implemented with telephones connected by electric wires or fiber optic links to the central station 14.

Figure 2:
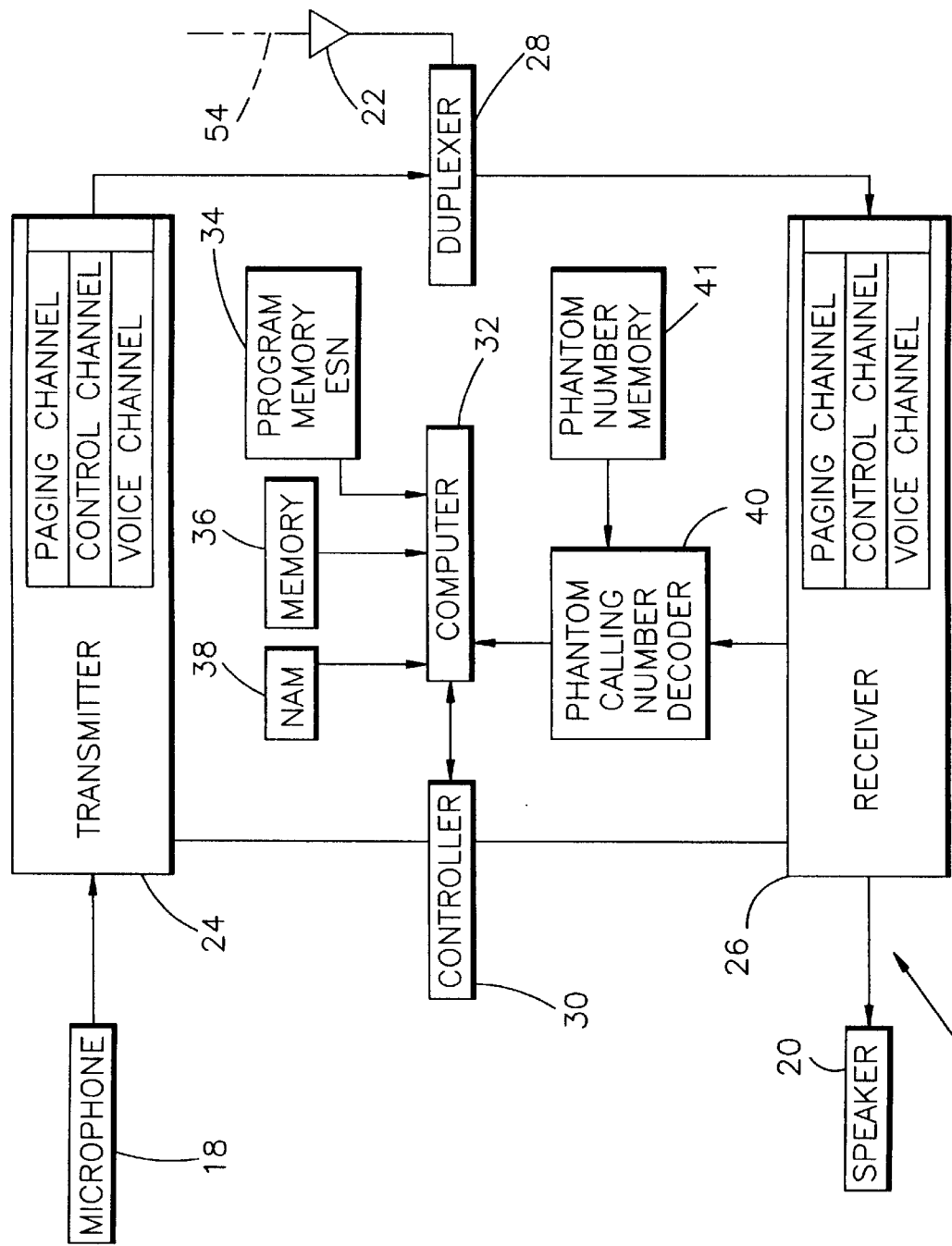
FIG. 2 is a block diagram showing details of a mobile telephone of FIG. 1.

The telephones 12, for purposes of explaining the invention, are assumed to be mobile telephones constructed in similar fashion, the construction of one of the telephones 12 being shown in FIG. 2. Each of the telephones 12 comprises a microphone 18, a speaker 20, an aerial or antenna 22, a transmitter 24 connected to the microphone 18, a receiver 26 connected to the speaker 20, and a diplexer 28 interconnecting the transmitter 24 and the receiver 26 to the antenna 22. Also included in the telephone 12 is a controller 30 which operates in concert with a computer 32 for controlling operation of the transmitter 24 and the receiver 26. The telephone 12 is shown, by way of example, as an analog type of mobile telephone, it being understood that the invention can be practiced also with the digital type of mobile telephone. Various functions of the controller 30, such as initiation of transmission or reception of a message, are well known, and need not be described in further detail herein. Connecting with the computer 32 are a program memory 34, a memory 36, and a number assignment module (NAM) 38 which may be constructed as a part of the memory 36, if desired. Also, in accordance with the invention, the mobile telephone 12 includes a phantom calling-number decoder 40 connected between the receiver 26 and the computer 32, the function of the decoder 40 to be explained hereinafter in conjunction with a memory 41 storing phantom calling numbers.

As shown in FIG. 1, the activation unit 16 comprises a computer 42, and a modem 44 which serves to interconnect the computer 42 with the central station 14. A memory 46 storing available calling numbers, and a memory 48 storing authenticated electronic serial numbers (ESN) are connected to the computer 42 for providing information of available calling numbers and authenticated ESN to the computer 42. Also connected to the computer 42 is a memory 50 which stores a glossary of reserved calling numbers, or phantom calling numbers suitable for communication on a paging channel in each of the respective telephones 12. The phantom numbers are not to be utilized as calling numbers for any one of the telephones 12. In accordance with the invention, the phantom calling numbers are utilized for encoding a message transmitted by the computer 42 via the central station 14 to the telephones 12. The encoding of the message with the phantom calling numbers is accomplished by an encoder 52 which is operated by the computer 42, and interconnects the memory 50 with the modem 44.

In the operation of the system 10 and with reference to FIGS. 1 and 2, one of the telephones 12 is able to initiate communication with a second of the telephones 12 by transmitting the calling number to the central station 14. Each of the telephones 12 has a control channel through which signals are communicated for initiating telephone communication, and the performance of other functions such as those employed during a hand-off from one telephone cell to another telephone cell. Included within the control channel is a paging channel for communication of the calling numbers. Initiation of the communication is accomplished by use of the transmitter 24 which transmits a calling number via its paging channel, the calling number being suitably modulated onto a carrier to be coupled via the diplexer 28 to the antenna 22. The carrier signal is radiated by the antenna 22 along a wireless communication link 54 to the central station 14.

The paging channel is adapted, in a well-known fashion, to communicate the calling numbers. Upon receipt of a calling number by the second telephone 12 from the control station 14, the paging channel of the receiver channel 26 recognizes the presence of a calling number. Each signal carrying a calling number is decoded by the decoder 40 and applied to the computer 32 whereby the calling number is examined to determine whether the calling number is directed to the second telephone 12 or to some other telephone 12. If the calling number is recognized as applying to the second telephone 12, the second telephone 12 responds by a signal transmitted via its control channel to initiate communication with the first telephone 12. Operation of the controller 30 and the computer 32 is accomplished by use of instructions stored in the program memory 34, while the memory 36 is employed in the various data processing steps performed by the computer 32 and the controller 30 in the operation of a mobile telephone 12. The communication of speech between two of the telephones 12 is accomplished via the voice channel in their respective transmitters 24 and the receivers 26. The foregoing description of the initiation of operation of the system 10 to establish a voice communication link between two of the telephones is brief and simplified because such system operation is well known and need not be further described herein for an understanding of the invention.

In accordance with the invention, it is recognized that communication via the paging channel of the calling number can be accomplished between a transmitter 24 of a telephone 12 and the central station 14 even prior to assignment of a specific calling number to the telephone 12. This is in contrast to communication via the voice channel which requires that telephones be assigned calling numbers whereby one telephone can designate the other telephone with which it is to communicate. The activation process, whereby a telephone becomes capable of operation within the system 10, may include also billing and other monitoring functions in addition to the assignment of a calling number.

The activation unit 16 is responsive to all calling numbers and ESN. Thus, a specific telephone 12 desiring activation transmits, via its paging channel, the calling number of the activation unit 16. The calling number is transmitted via the central station 14 to the activation unit 16 to initiate communication of a paging message. Included within the paging message to the activation unit 16 is the ESN of the specific telephone 12. Also transmitted on the message to the activation unit 16 is a request for the activation unit 16 to issue a calling number to the specific telephone 12.

In the operation of the activation unit 16, the paging-channel request for a calling number is received at the computer 42 via the modem 44. The computer 42 responds to the request for a calling number by comparing the ESN of the specific telephone 12 with all ESN stored in the memory 48 to verify that the ESN of the specific telephone 12 is a valid ESN. By way of example, in the case of a person purchasing or leasing a mobile telephone at a dealer of telephones, the dealer communicates with the telephone company which operates the system 10, and informs the telephone company of the ESN of the telephone 12 which has just been purchased or leased. In addition, the dealer informs the telephone company of credit and other billing data which may be necessary for billing the telephone customer for service provided by the system 10 to the customer. Upon receipt of this information, the telephone company immediately enters the ESN of the specific telephone 12 into the memory 48 to indicate to the computer 42 that the ESN of the specific telephone 12 is a valid ESN.

The telephone company also enters into the memory 46 all of the available calling numbers which may be assigned to new telephones 12 upon their activation. Thereby, upon receipt by the computer 42 of a request for activation, the computer 42 is able to verify the ESN of the specific telephone 12 received over the paging channel, this being accomplished by comparing the ESN received via the paging channel with all ESN stored in the memory 48. If a match is obtained, the ESN is valid. The computer 42 then selects one of the available calling numbers from the memory 46 to be issued to the specific telephone 12.

Any of the telephones 12, whether activated or not yet activated, can receive an incoming calling number via its paging channel. However, in the case of an unactivated telephone 12, the unactivated telephone is unable to respond to the reception of a calling number other than a phantom calling number. In the case of the activated telephone, the activated telephone can immediately verify whether the calling number is its own calling number or the calling number of some other telephone.

In order to communicate an activation command message from the activation unit 16 to the specific telephone 12, the outgoing command message from the activation unit to the specific telephone 12 is encoded by encoding each word of the command message with a phantom calling number from the glossary of phantom numbers stored within the memory 50. The calling numbers of the glossary differ from the numbers stored in the listing of available calling numbers in the memory 46. Thereby, any one of the phantom numbers can be transmitted via the system 10 without interfering with the operation of the system 10 since there is no telephone 12 having as its designated calling number one of the phantom calling numbers. As will be described in further detail with reference to FIG. 4, the command message includes both the assigned calling number and the ESN of the mobile telephone 12 along with an indication, such as a start-of-message (SOM) flag at the beginning of the message which informs the specific telephone 12 that this is a command message commanding the telephone 12 to receive its designated calling number.

With respect to the encoding of the command message with the phantom calling numbers, it is noted that, by analogy with Morse code wherein dots and dashes are employed to represent a specific letter of the alphabet, herein one or more of the phantom numbers are employed to identify a specific letter or word of the command message. Accordingly, in the operation of the activation unit 16, the computer applies each word of the command message to the encoder 52. The encoder 52 extracts from the memory 50 the appropriate calling number for encoding each of the respective words of the command message, and outputs the command message to the modem 44 for communication via the central station 14 to all of the telephones 12.

At each of the mobile telephones 12 of the system 10, all incoming calling numbers, received via the paging channel of the receiver 26, are applied via the decoder 40 to the computer 32. The decoder 40 is operative in conjunction with the memory 41 which also stores the phantom calling numbers, so as to render the decoder 40 responsive to each of the phantom calling numbers of the glossary in the memory 50. Any other calling number not found in the glossary is rejected by the decoder 40. Rejected numbers are understood to be normal calling numbers and need not be processed by the computer 32 in an activation procedure. All such calling numbers, exclusive of those in the glossary of the memory 50, are processed by the computer 32 in the manner well known to the operation of cellular telephone systems, such as the system 10. The processing by the computer 32 provides verification of whether the incoming calling number is identical to the assigned calling number of the respective telephone 12. Thereby, the computer 32 is able to process separately the valid calling numbers which have been assigned to the respective telephones 12, and the phantom calling numbers which are employed for activation of a telephone 12.

Upon reception of a phantom calling number via the paging channel of a receiver 26, the decoder 40 decodes the phantom calling number as well as succeeding calling numbers in the series of phantom calling numbers which constitute the command word. The decoded command word is applied via the decoder 40 to the computer 32. The computer 32 responds to the command message by comparing the ESN of the command message with the ESN of the specific telephone 12. If the ESN are not the same, it is understood that the command message is intended for some other telephone rather than the specific telephone 12. Accordingly, the computer 32 rejects the command message and no further action need be taken by the specific telephone 12 with respect to that command message. The ESN assigned to the specific telephone 12 is stored in the program memory 34. However, in the event that the incoming command message has an ESN which is identical to the ESN stored in the memory 34, then the command message is directed to the specific telephone 12. Accordingly, the computer 32 enters the calling number of the command message into the NAM 38 to be stored permanently therein as the assigned calling number for the specific telephone 12. The specific telephone 12 is now activated and is able to respond to calling numbers transmitted by other ones of the mobile telephones 12 for initiating a voice communication.

Figure 3:
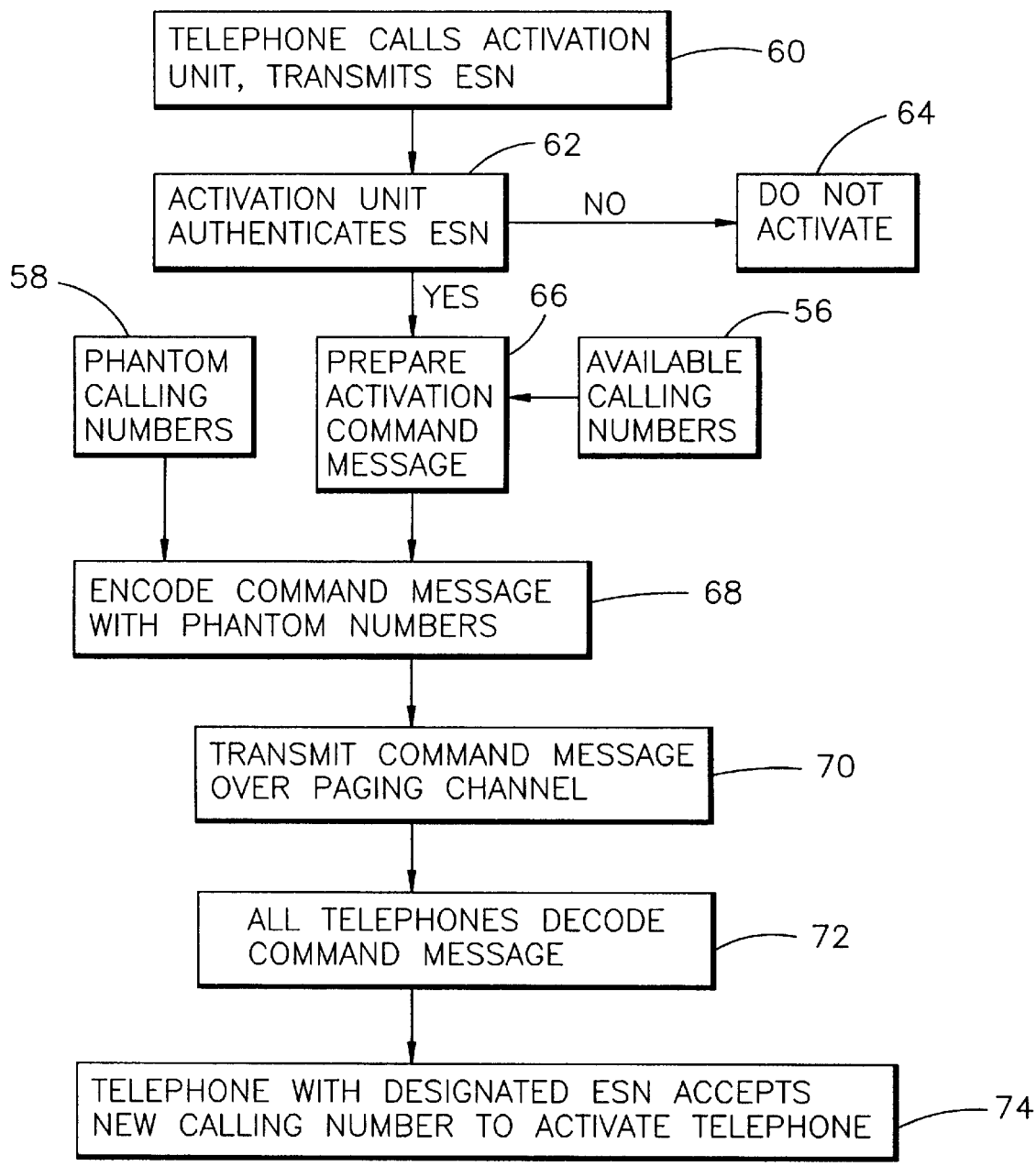
FIG. 3 is a flow chart showing the steps in carrying out the procedure of the invention.

FIG. 3 outlines the foregoing activation procedure. Storage of the available calling numbers, as shown in the memory 46 of FIG. 1, is indicated at block 56. The storage of the glossary of phantom calling numbers, stored in the memory 50 of FIG. 1, is indicated at block 58 in FIG. 3. The procedure begins at block 60 wherein the specific telephone, for which activation is desired, calls the activation unit 16 (FIG. 1) and transmits the ESN of the specific telephone to be activated. At block 62, the activation unit checks the ESN to authenticate the ESN. In the event that the authentication fails, and the ESN is not valid, then no activation occurs as is indicated at block 64. However, in the event that the ESN is valid, the procedure passes to block 66 wherein the activation command message is prepared. Included within the command message is a calling number from the supply of available calling numbers at block 56. Also included in the command message is the ESN of the specific telephone requesting activation.

The procedure passes to block 68 wherein the command message is encoded with the phantom calling numbers provided by block 58. Then at block 70, the command message is transmitted by the activation unit via the central station to all the telephones via their respective paging channels. At all the telephones, their respective decoders decode the phantom calling numbers, as indicated at block 72. Subsequent to the decoding of the command message, there is a check made in each of the telephones to determine whether the ESN of the command message matches the ESN of each of the respective telephones of the system. Then, at block 74, the telephone with the designated ESN accepts the new calling number for activation of the telephone.

FIG. 4 shows the construction of a command message issued by the activation unit 16 (FIG. 1) for activating the specific mobile telephone 12 in response to a request by the telephone 12 for a calling member. The construction of the command message, as set forth in FIG. 4, is presented by way of example, it being understood that other arrangements of the bytes of the message may be employed in its construction. As shown in FIG. 4, the first byte SOM flag indicates the start of the message, and also indicates that this is a command message providing instructions for activating a telephone. The second through the fifth byte are reserved for digits of the ESN. The sixth through the eighth byte, indicated by MIN, are reserved for the digits of the calling number which is assigned to the specific telephone. The ninth and the tenth byte are reserved for subscriber identity data (SID) which identifies a telephone system area in which the mobile telephone is generally located. The eleventh byte is identified as FLAGS and is set aside for additional data which might possibly be desired to be transmitted. The twelfth and the thirteenth byte are preserved for a cyclic redundancy checksum (CRC) which is employed for error correction in the transmission of the message, such error correction being well known. The last byte is the fourteenth byte which is an end of message (EOM) flag, and designates to the specific mobile telephone that the command message has been completed. Each byte may be composed of eight bits, or other convenient number of bits if desired.

The procedure of the invention is advantageous because it is operative with existing software customarily utilized in mobile telephone systems. The procedure can be conducted automatically without need for entry of any user signals via a keyboard. By way of example, upon power-up of the telephone 12, the computer 32 can search the NAM 38 (FIG. 2) to determine if a calling number is present and, in the absence of a calling number initiate the request for a calling number from the activation unit 16 (FIG. 1). The procedure of the invention is operable with telephone systems operating in accordance with CDMA (Code Division Multiple Access), TDMA (Time Division Multiple Access), TACS (Total Access Communication System as is used in the United Kingdom), and AMPS (Advanced Mobile Phone System as used in the United States). The assignment of the calling number or MIN is accomplished by use of existing channels of the transmitter and receiver in accordance with MACC (MIN Assignment on Control Channel).

As an example in the utilization of the procedure, an instruction card included with the mobile phone might provide the following set of instructions. The procedure would begin by requesting that the user plug in the telephone charger. Thereupon, the telephone will display "please wait". Subsequently, the telephone rings and, upon a pressing of the Send Key by the user of the telephone, an operator will inform the user of the phone number. The telephone is now suitably programmed and ready for use.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method for activating remotely a telephone, in a system of multiple telephones, the method comprising steps of:

establishing a glossary of phantom calling numbers reserved only for encoding words of a command message, the command message providing a calling number for activation of a specific telephone of the system;

transmitting by the specific telephone a request message identifying an electronic serial number of the specific telephone and requesting a calling number for the specific telephone;

in response to the request message, providing a calling number designated for the specific telephone, the designated calling number differing from the phantom numbers of the glossary;

constructing the command message with the electronic serial number of the specific telephone, and including within the command message, the designated calling number of the telephone;

encoding the command message with numbers from the glossary of phantom calling numbers to provide an encoded command message;

communicating the encoded command message to the multiple telephones of the system;

decoding the command message by each of the multiple telephones; and activating the specific telephone, identified by its electronic serial number, by installing the designated calling number in the specific telephone.

2. A method according to claim 1 wherein said telephones are mobile telephones, and said transmitting step is accomplished via a control channel of the specific telephone.

3. A method according to claim 1 wherein said communicating step is accomplished via a paging channel of the specific telephone.

4. A method for activating a mobile telephone by transmitting to the mobile telephone a command message providing a calling number designated for the mobile telephone, wherein the mobile telephone is part of a radiotelephone system having multiple telephones communicating via wireless telephone communication links, wherein said communication links include a paging channel operative with calling numbers to which individual ones of said multiple telephones are responsive, the multiple telephones having respective electronic serial numbers for identifying the respective telephones, the method comprising the steps of:

establishing a glossary of calling numbers reserved only for encoding words of a command message, the command message providing a calling number for a specific mobile telephone of the system, the calling number differing from numbers of the glossary;

constructing the command message with the electronic serial numbers of the specific mobile telephone, and including within the command message a designated calling number of the specific telephone;

encoding the command message with numbers from the glossary calling numbers to provide an encoded command message; and activating the specific telephone, identified by its electronic serial number, by communicating the encoded command message to the multiple telephones, and by installing the designated calling number in the specific mobile telephone.

* * * * *